United States Patent
Kusaba et al.

(10) Patent No.: US 10,220,967 B2
(45) Date of Patent: Mar. 5, 2019

(54) FLEXIBLE THERMAL-CONTROL MATERIAL

(71) Applicant: MITSUBISHI HEAVY INDUSTRIES, LTD., Tokyo (JP)

(72) Inventors: Naoki Kusaba, Tokyo (JP); Hidetaka Kafuku, Tokyo (JP); Kenji Najima, Hyogo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 163 days.

(21) Appl. No.: 14/904,727

(22) PCT Filed: Aug. 26, 2014

(86) PCT No.: PCT/JP2014/072240
§ 371 (c)(1),
(2) Date: Jan. 13, 2016

(87) PCT Pub. No.: WO2015/029974
PCT Pub. Date: Mar. 5, 2015

(65) Prior Publication Data
US 2016/0159501 A1    Jun. 9, 2016

(30) Foreign Application Priority Data

Aug. 28, 2013 (JP) .................. 2013-177362
Mar. 31, 2014 (JP) .................. 2014-072893

(51) Int. Cl.
*B32B 7/12* (2006.01)
*B64G 1/10* (2006.01)
(Continued)

(52) U.S. Cl.
CPC .................. *B64G 1/58* (2013.01); *B32B 7/12* (2013.01); *B32B 27/281* (2013.01); *B32B 37/12* (2013.01);
(Continued)

(58) Field of Classification Search
CPC .. B64G 1/58; B64G 1/402; B64G 1/10; B32B 7/12; B32B 27/281; B32B 2375/00; B32B 2379/08; B32B 2383/00
See application file for complete search history.

(56) References Cited

U.S. PATENT DOCUMENTS 3,321,154 A    5/1967  Downs
3,765,558 A *  10/1973 Withers ................ B29C 70/08
                                              220/560.15
(Continued)

FOREIGN PATENT DOCUMENTS

EP    2 660 632    11/2013
EP    2 667 226    11/2013
(Continued)

OTHER PUBLICATIONS

Extended European Search Report dated Apr. 26, 2016 in corresponding European Application No. 14839959.5.
(Continued)

*Primary Examiner* — Hai Vo
(74) *Attorney, Agent, or Firm* — Wenderoth, Lind & Ponack, L.L.P.

(57) ABSTRACT

This flexible thermal-control material (10A) is obtaining by stacking: a reflective layer (12) which reflects sunlight; and an infrared-ray emission layer (13) which emits infrared rays. The infrared-ray emission layer (13) is configured from a silicone material. Accordingly, a flexible thermal-control material is achieved which exhibits excellent optical characteristics such as solar absorption (α).

6 Claims, 9 Drawing Sheets

(51) Int. Cl.
  *B64G 1/40* (2006.01)
  *B64G 1/58* (2006.01)
  *G02B 5/08* (2006.01)
  *G02B 5/20* (2006.01)
  *B32B 27/28* (2006.01)
  *B32B 37/12* (2006.01)
  *B32B 37/18* (2006.01)

(52) U.S. Cl.
  CPC .............. *B32B 37/18* (2013.01); *B64G 1/10* (2013.01); *B64G 1/402* (2013.01); *G02B 5/0866* (2013.01); *B32B 2037/1246* (2013.01); *B32B 2307/30* (2013.01); *B32B 2307/416* (2013.01); *B32B 2307/546* (2013.01); *B32B 2375/00* (2013.01); *B32B 2379/08* (2013.01); *B32B 2383/00* (2013.01); *B32B 2605/18* (2013.01); *G02B 5/208* (2013.01)

(56) References Cited

U.S. PATENT DOCUMENTS

| | | | |
|---|---|---|---|
| 4,151,800 A | 5/1979 | Dotts et al. | |
| 5,527,562 A * | 6/1996 | Balaba | C09D 183/04 427/162 |
| 5,589,274 A * | 12/1996 | Long | B64G 1/226 428/213 |
| 6,284,385 B1 * | 9/2001 | Guillaumon | B64G 1/503 428/450 |
| 6,572,974 B1 * | 6/2003 | Biscotte | G02F 1/19 257/E21.008 |
| 6,613,393 B1 * | 9/2003 | Rauschnabel | B05D 1/62 204/192.12 |
| 2002/0026955 A1 * | 3/2002 | Ouchida | H01L 31/03767 136/251 |
| 2003/0026998 A1 | 2/2003 | Yamaguchi et al. | |
| 2004/0058119 A1 * | 3/2004 | Wynne | B29C 53/063 428/69 |
| 2004/0178967 A1 * | 9/2004 | Long | H01Q 1/288 343/912 |
| 2006/0211272 A1 * | 9/2006 | Lee | B82Y 10/00 438/789 |
| 2008/0045639 A1 * | 2/2008 | Cumberland | C09D 5/32 524/437 |
| 2008/0286473 A1 * | 11/2008 | Smith | B64D 15/00 427/368 |
| 2014/0255628 A1 * | 9/2014 | Fesmire | B65D 90/06 428/34.1 |
| 2015/0146287 A1 * | 5/2015 | Kuhlmann | B29D 11/00 359/360 |

FOREIGN PATENT DOCUMENTS

| | | |
|---|---|---|
| JP | 61-64440 | 4/1986 |
| JP | 62-258292 | 11/1987 |
| JP | 1-175600 | 7/1989 |
| JP | 3-65498 | 3/1991 |
| JP | 4-238797 | 8/1992 |
| JP | 05-270500 | 10/1993 |
| JP | 07-26718 | 5/1995 |
| JP | 2676208 | 11/1997 |
| JP | 11-291999 | 10/1999 |
| JP | 2002-47473 | 2/2002 |
| JP | 2003-113264 | 4/2003 |
| JP | 2007-253399 | 10/2007 |
| WO | WO-2013158049 A1 * 10/2013 ............... C09D 5/32 |

OTHER PUBLICATIONS

Written Opinion of the International Searching Authority dated Nov. 25, 2014 in International Application No. PCT/JP2014/072240.
International Search Report dated Nov. 25, 2014 in International Application No. PCT/JP2014/072240.
Notification of Reasons for Refusal dated Mar. 6, 2018 in Japanese Patent Application No. 2014-072893, with Machine Translation.

* cited by examiner

FLEXIBLE THERMAL-CONTROL MATERIAL

TECHNICAL FIELD

The present invention relates to a flexible thermal-control material.

BACKGROUND ART

In order to prevent an increase in temperature of an airframe due to incidence of solar light, a surface of an artificial satellite or a rocket used in space is coated with a thermal-control material having a function of reflecting the solar light and radiating thermal energy of the solar light to space.

A flexible thermal-control material, a so-called flexible optical solar reflector (OSR), having flexibility which is easily processed according to a surface shape of the airframe or a structure to be coated, is paid attention as the thermal-control material.

PTL 1 discloses a flexible thermal-control material including a metal layer on a polyimide film. In PTL 1, the surface of the polyimide film is subjected to roughening treatment, and accordingly secondary reflection of solar light is prevented and reflectivity and diffuseness are improved.

CITATION LIST

Patent Literature

[PTL 1] Japanese Unexamined Patent Application Publication No. 2007-253399

SUMMARY OF INVENTION

Technical Problem

However, in the flexible thermal-control material used in space, applicability in various space missions and particularly low optical properties in a solar absorptance coefficient ($\alpha$) are required.

It is required that a low solar absorptance coefficient ($\alpha$) and a high total semi-sphere infrared emissivity ($\varepsilon$) are satisfied, and in order to realize long-term use in space, it is required that all conditions of high tolerance to radiation and high tolerance to atomic oxygen in space are satisfied.

However, the flexible thermal-control material disclosed in PTL 1 does not satisfy the conditions of the optical properties.

The present invention has been made to address the aforementioned problems and provide a flexible thermal-control material having excellent optical properties when it is used in space.

Solution to Problem

The invention provides a flexible thermal-control material configured by laminating a reflection layer which reflects solar light and an infrared radiation layer which radiates infrared light, and the infrared radiation layer is configured with a silicone material.

In the flexible thermal-control material, it is preferable that the infrared radiation layer includes a silicone layer configured with a silicone material and an adhesive layer, and the adhesive layer is provided between the silicone layer and the reflection layer.

In the flexible thermal-control material, it is preferable that the adhesive layer is a silicone-based adhesive layer.

In the flexible thermal-control material, it is preferable that a support layer is further laminated on a surface of the reflection layer on the side opposite to the surface where the infrared radiation layer is laminated.

In the flexible thermal-control material, it is preferable that a protection layer is further laminated on a surface of the infrared radiation layer on the side opposite to the surface where the reflection layer is laminated.

In the flexible thermal-control material, it is preferable that a conductive layer is further laminated on the protection layer.

In the flexible thermal-control material, it is preferable that an antioxidant layer is further laminated on a surface of the reflection layer on the side opposite to the surface where the infrared radiation layer is laminated.

In the flexible thermal-control material, it is preferable that the antioxidant layer is provided between the reflection layer and the support layer.

In the flexible thermal-control material, it is preferable that the flexible thermal-control material is fixed to a surface of an adherend by a bonding layer or a fastening member.

In the flexible thermal-control material, it is preferable that the adherend is a propellant tank of a rocket or an artificial satellite used in space.

In the flexible thermal-control material, it is preferable that the propellant tank is a liquid hydrogen tank.

In the flexible thermal-control material, it is preferable that a surface of the adherend is any one of a polyisocyanurate foam (PIF) heat insulating layer and a polyimide foam heat insulating layer or a heat insulating layer of a laminated body thereof.

In the flexible thermal-control material, it is preferable that the surface of the adherend includes a degassing groove in any one of a polyisocyanurate foam (PIF) heat insulating layer and a polyimide foam heat insulating layer or a heat insulating layer of a laminated body thereof.

Advantageous Effects of Invention

The invention exhibits an effect of providing a flexible thermal-control material having excellent optical properties such as a solar absorptance coefficient ($\alpha$).

DESCRIPTION OF EMBODIMENTS

Hereinafter, the invention will be described with reference to the accompanied drawings. The invention is not limited to the following embodiments or examples. In addition, constituent elements of the following embodiments or examples include constituent elements which can be and are easily replaced by a person skilled in the art, or the same constituent elements.

Example 1

Figure 1:
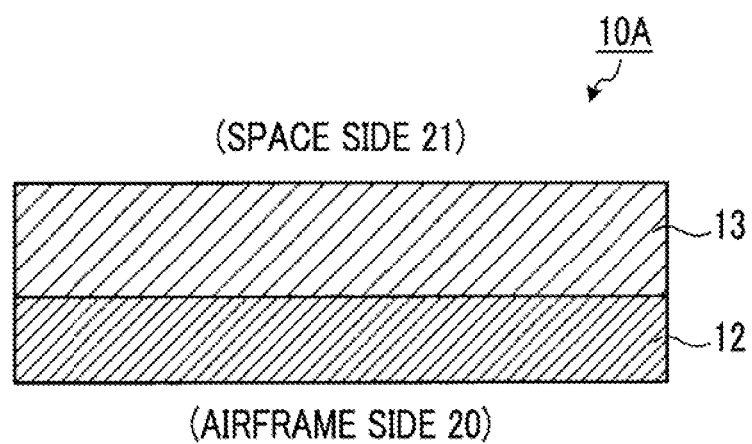
FIG. 1 is a schematic sectional view showing a configuration example of a flexible thermal-control material according to Example 1.

FIG. 1 is a schematic sectional view showing a configuration example of a flexible thermal-control material according to Example 1. As shown in FIG. 1, a thermal-control material 10A according to the example includes a reflection layer 12 and an infrared radiation layer 13. In the example of FIG. 1, the reflection layer 12 is provided on an adherend side (lower side of the drawing) and the infrared radiation layer 13 is provided on the outer side (upper side of the drawing) of the reflection layer 12. That is, in the example of the drawing, the reflection layer 12 is provided on an airframe side 20 which is the adherend and the infrared radiation layer 13 is provided as a surface of a space side 21. That is, in this example, the infrared radiation layer 13 is set as a layer exposed to space.

<Reflection Layer>

The reflection layer 12 is preferably a high-reflectivity material layer. Accordingly, it is possible to reduce heat input to the airframe, by reflecting solar light. Herein, the high-reflectivity material layer is a layer configured with a material called high-reflectivity metal. As specific examples of such high-reflectivity metal, silver (Ag), aluminum (Al), and gold (Au) can be used, for example, but the specific examples are not limited thereto. In addition, as the high-reflectivity metal, an alloy, a compound, or a composite material thereof can be used, in addition to the simple substance of metal elements.

<Infrared Radiation Layer>

The infrared radiation layer 13 is a layer having a function of radiating heat to space without absorbing solar light which is reflected by the reflection layer 12. Since space is in a vacuum state without oxygen, heat transfer due to radiation which does not require a heat transfer medium, is dominantly performed. Heat of the airframe side 20 is more easily radiated to space, as infrared emissivity increases. Accordingly, in the infrared radiation layer 13, as absorption of a solar light wavelength region is small and infrared emissivity is great, it is possible to prevent an increase in temperature of the airframe.

The infrared radiation layer 13 is a layer configured with a silicone layer such as a silicone resin. As one silicone material, a polymer substance having a siloxane bond (Si—O—Si) as a main skeleton, such as a silicone resin, a silicone rubber, or silsesquioxane are also included. Here, a silicone resin and a silicone rubber are provided as a material including an organic group in both ends of silicon (Si) and silsesquioxane is provided as a material including an organic group and oxygen in respective ends of silicon (Si).

By using the silicone material as the infrared radiation layer 13, it is possible to ensure sufficient transparency for solar light to be incident to the reflection layer 12 and to ensure radioactive properties for radiating heat of the flexible thermal-control material to space. In addition, the silicone material has excellent radiation resistance and resistance to atomic oxygen, and accordingly, it is possible to realize a flexible thermal-control material which hardly causes performance degradation due to the space environment, by using the silicone material as the infrared radiation layer 13.

A thickness of the infrared radiation layer 13 is preferably from 50 μm to 150 μm. In this range, excellent balance between a solar absorptance coefficient ($\alpha$) and a total semi-sphere infrared emissivity ($\varepsilon$) is obtained.

According to the configuration described above, it is possible to realize a flexible thermal-control material having excellent balance in which the solar absorptance coefficient ($\alpha$) is equal to or less than 0.2 and the total semi-sphere infrared emissivity ($\varepsilon$) is equal to or greater than 0.8. Although the control effect of an increase in temperature of the airframe decreases, it is also possible to set the thickness of the infrared radiation layer 13 to be smaller than 50 μm, if it is in an acceptable range in thermal design.

By using a silicone material having excellent radiation resistance and resistance to atomic oxygen, it is possible to improve radiation resistance and resistance to atomic oxygen of the entire thermal-control material (thermal-control film) and to provide a flexible thermal-control material which hardly causes performance degradation in space.

According to the configuration described above, it is possible to provide a flexible thermal-control material which is excellently adhered to various structures which is an adherend. In addition, by setting a roll molded body by winding the sheet-like flexible thermal-control material around a core, it is possible to perform the application to an adherend having a cylindrical outer shape.

Example 2

Figure 2A:
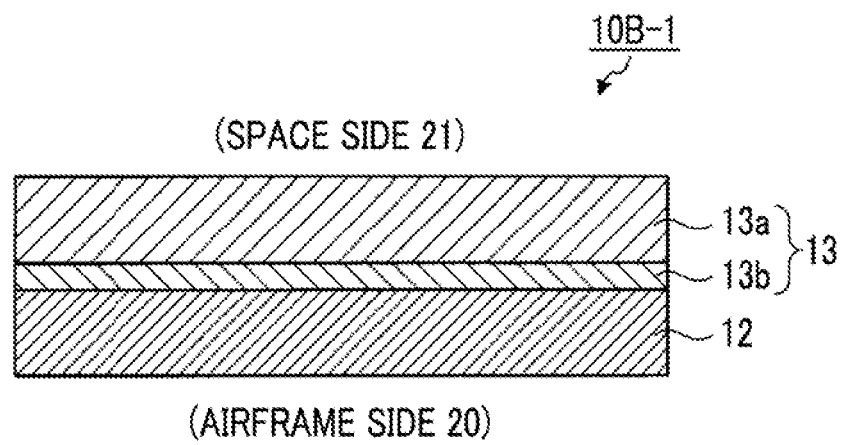
FIG. 2A is a schematic sectional view showing a configuration example of a flexible thermal-control material according to Example 2.

FIG. 2A is a schematic sectional view showing a configuration example of a flexible thermal-control material according to Example 2. As shown in FIG. 2A, the infrared radiation layer 13 of a flexible thermal-control material 10B-1 of the example includes a silicone layer 13a and an adhesive layer 13b. The adhesive layer 13b is provided between the silicone layer 13a and the reflection layer 12 and is a layer for bonding both layers. In the example, the same reference numerals are used for the same constituent elements as those in Example 1 and the description thereof will be omitted.

The silicone layer 13a is a layer having a silicone material such as a silicone resin as a component. By using the silicone layer 13a as the infrared radiation layer 13, it is possible to ensure sufficient transparency for solar light to be incident to the reflection layer 12 and to ensure radioactive properties for radiating heat energy of solar light to space. In addition, the silicone material has excellent radiation resistance and resistance to atomic oxygen, and accordingly, it is possible to realize a flexible thermal-control material 10B-1 which hardly causes performance degradation due to the space environment, by using the silicone layer 13a containing a silicone material as the infrared radiation layer 13.

The adhesive layer 13b is preferably configured with a silicone-based adhesive. This is because the silicone-based adhesive has excellent adhesiveness with the silicone layer 13a and excellent heat resistance, radiation resistance, and resistance to atomic oxygen in space.

The silicone-based adhesive is an adhesive having silicone as a base. Any of an addition reaction type and a peroxide-curing type may be used.

The silicone layer 13a and the adhesive layer 13b are common in that both layers have a polymer substance having a siloxane bond as a main skeleton, as a material, and both layers may be configured as separate bodies or may be integrally configured. The layers are integrally configured in the example of FIG. 1 and the layers are configured as separate bodies in the example of FIG. 2.

A thickness of the adhesive layer 13b is, for example, from 10 μm to 100 μm, when the thickness of the entire infrared radiation layer 13 is from 50 μm to 300 μm.

According to the configuration described above, it is possible to realize a flexible thermal-control material having excellent balance between the solar absorptance coefficient ($\alpha$) and the total semi-sphere infrared emissivity ($\epsilon$). By setting the adhesive layer as a silicone-based adhesive layer, it is possible to excellently bond the infrared radiation layer and the reflection layer to each other without disturbing solar absorptance coefficient ($\alpha$), the total semi-sphere infrared emissivity ($\epsilon$), radiation resistance, and resistance to atomic oxygen which are properties of the silicone material-made infrared radiation layer.

Figure 2B:
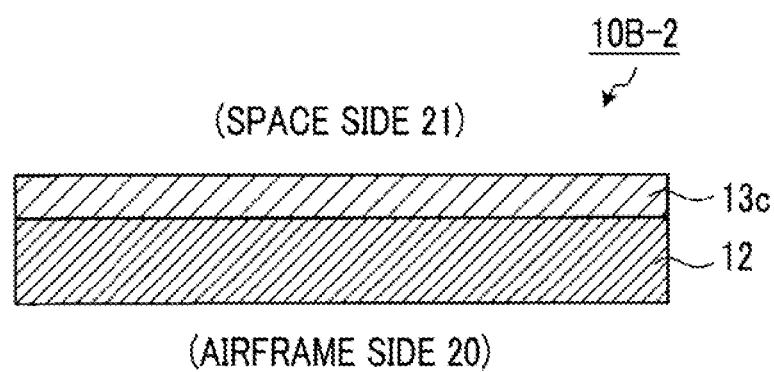
FIG. 2B is a schematic sectional view showing a configuration example of another flexible thermal-control material according to Example 2.

FIG. 2B is a schematic sectional view showing a configuration example of another flexible thermal-control material according to Example 2. As shown in FIG. 2B, in the infrared radiation layer 13 of a flexible thermal-control material 10B-2 of the example, a silsesquioxane layer 13c is provided on the outer side (upper side of the drawing) of the reflection layer 12.

By using the silsesquioxane layer 13c as the infrared radiation layer 13, it is possible to ensure sufficient transparency for solar light to be incident to the reflection layer 12. Accordingly, by using the silsesquioxane layer 13c as the infrared radiation layer 13, it is possible to realize the flexible thermal-control material 10B-2 which hardly causes performance degradation due to the space-environment.

The silsesquioxane layer 13c can be applied to the reflection layer 12 to form a coating layer by ultraviolet curing or thermal curing, for example. A coating thickness of the silsesquioxane layer 13c can be set to be equal to or smaller than 10 μm, the solar absorptance coefficient ($\alpha$) is equal to or less than 0.1, and low cost can be realized.

It is preferable to form the silsesquioxane layer 13c, because resistance to atomic oxygen is high in the silicone material and no tackiness is obtained.

Example 3

Figure 3:
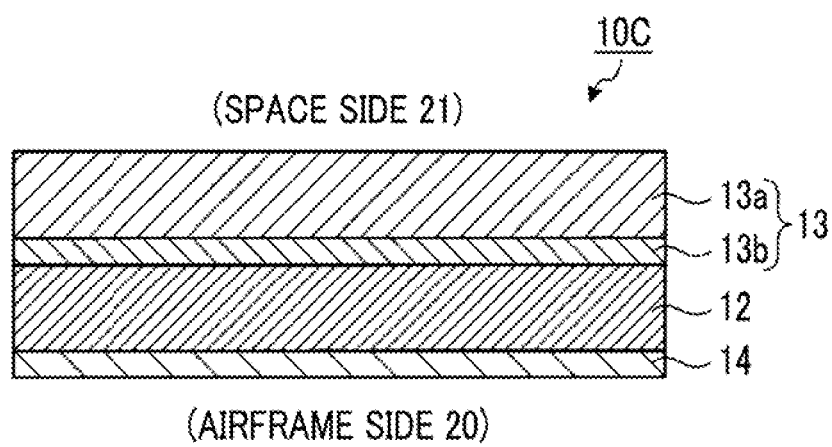
FIG. 3 is a schematic sectional view showing a configuration example of a flexible thermal-control material according to Example 3.

FIG. 3 is a schematic sectional view showing a configuration example of a flexible thermal-control material according to Example 3. As shown in FIG. 3, a flexible thermal-control material 10C is formed by further laminating an antioxidant layer 14 on a surface of the reflection layer 12 on the side opposite to the surface where the infrared radiation layer 13 is laminated, in the flexible thermal-control material 10B-1 according to Example 2. That is, the antioxidant layer 14 is further provided on the lower side of the reflection layer 12 (lower side of the drawing), that is, on the airframe side 20 of the structure coated with the flexible thermal-control material 10c. In the example, the same reference numerals are used for the same constituent elements as those in Example 1 or Example 2 and the description thereof will be omitted.

The antioxidant layer 14, for example, can be configured with a nickel-base super-alloy (inconel or the like), chromium, nickel, and gold (vapor deposition on an aluminum surface). Among these, a nickel-base superalloy is particularly preferable, from viewpoints of anti-oxidation properties and corrosion resistance.

According to the configuration described above, it is possible to further improve an anti-oxidation effect by atomic oxygen in space. In addition to the configuration of the example, in a case of providing a support layer, the antioxidant layer is preferably provided between the reflection layer and the support layer.

Example 4

Figure 4:
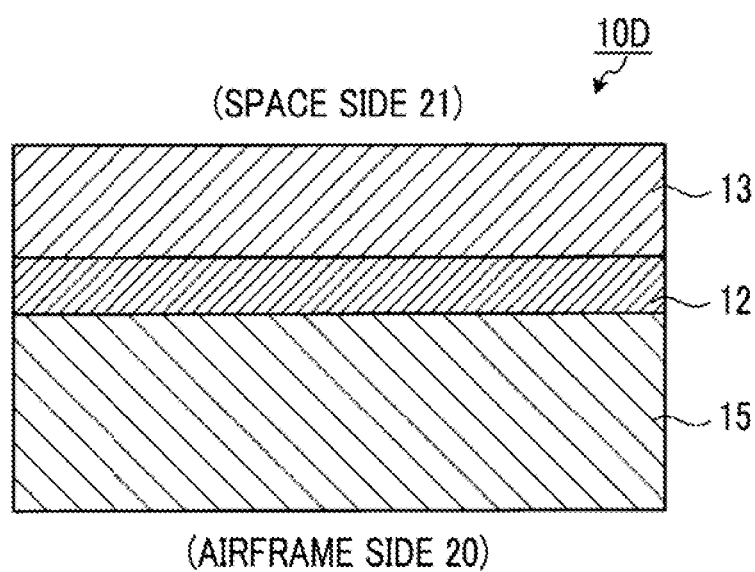
FIG. 4 is a schematic sectional view showing a configuration example of a flexible thermal-control material according to Example 4.

FIG. 4 is a schematic sectional view showing a configuration example of a flexible thermal-control material according to Example 4. As shown in FIG. 4, a flexible thermal-control material 10D is formed by further laminating a support layer 15 on a surface of the reflection layer 12 on the side opposite to the surface where the infrared radiation layer 13 is laminated, in the flexible thermal-control material 10A according to Example 1. That is, the support layer 15 is further provided on the lower side of the reflection layer 12 (lower side of the drawing), that is, on the structure (adherend) side coated with the flexible thermal-control material 10D.

If a tensile force is loaded when applying the flexible thermal-control material onto the adherend, cracks may be generated on the infrared radiation layer 13 or the reflection layer 12. The support layer 15 has a function and an effect of preventing generation of such cracks. This is for improving hardness or strength of the entire flexible thermal-control material 10D by the support layer 15.

As the support layer 15, it is preferable to use a polyimide material such as a polyimide resin from viewpoints of strength and heat resistance. Alternatively, a polyester material such as polyethylene-telephthalate (PET), which is a material having a function and an effect of preventing generation of cracks or tears on the reflection layer and the infrared radiation layer may be used.

According to the configuration described above, it is possible to apply suitable hardness ox strength to the flexible thermal-control material so as to be applied. Accordingly, it is possible to prevent generation of cracks on the reflection layer 12, when attaching or bonding the flexible thermal-control material to a structure (airframe) such as a rocket or an artificial satellite.

Example 5

Figure 5:
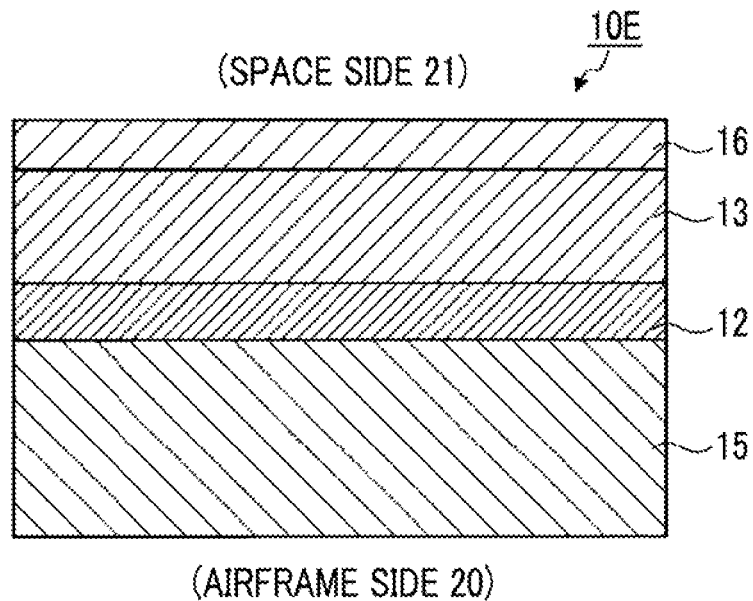
FIG. 5 is a schematic sectional view showing a configuration example of a flexible thermal-control material according to Example 5.

FIG. 5 is a schematic sectional view showing a configuration example of a flexible thermal-control material according to Example 5. As shown in FIG. 5, a flexible thermal-control material 10E is formed by further laminating a protection layer 16 on a surface of the infrared radiation layer 13 on the side opposite to the surface where the reflection layer 12 is laminated, in the flexible thermal-control material 10D according to Example 4. That is, the protection layer 16 is further provided on the upper side of the infrared radiation layer 13 (upper side of the drawing), that is, on the space side 21.

The protection layer 16 covers the surface of the silicone material having high tackiness (stickiness) so as to provide a function and an effect of preventing surface contamination of the flexible thermal-control material 10E. For example, when applying the flexible thermal-control material to a rocket, a propellant tank of the rocket becomes an adherend, and the outer surface of the propellant tank of the rocket is coated with the flexible thermal-control material. In this case, the protection layer 16 is provided on the surface of the silicone material layer so as to provide a function and an effect of preventing surface contamination of the flexible thermal-control material 10E from the application of the material to the rocket fire.

As the protection layer 16, it is preferable to configure silsesquioxane having higher resistance to atomic oxygen among the silicone materials. It is possible to obtain higher resistance to atomic oxygen, by coating the surface of the flexible thermal-control material with silsesquioxane.

Example 6

Figure 6:
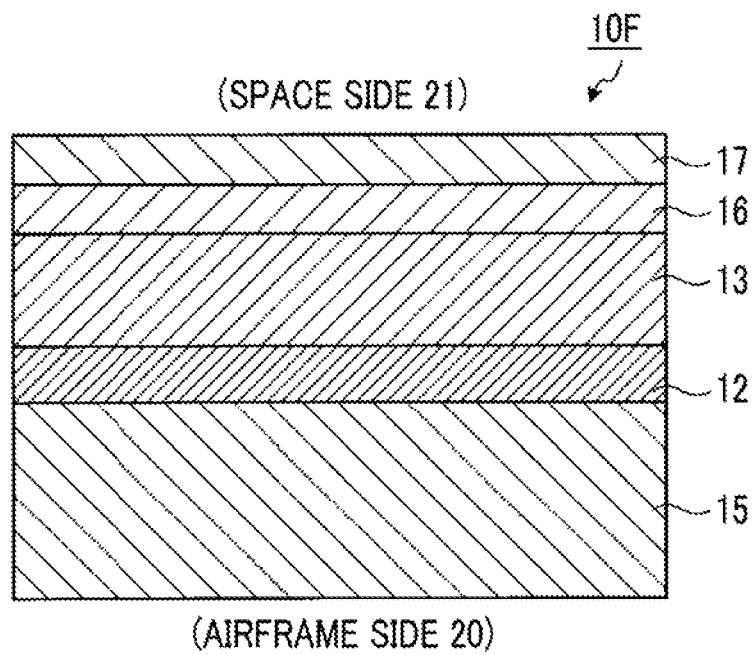
FIG. 6 is a schematic sectional view showing a configuration example of a flexible thermal-control material according to Example 6.

FIG. 6 is a schematic sectional view showing a configuration example of a flexible thermal-control material according to Example 6. As shown in FIG. 6, a flexible thermal-control material 10F is formed by further laminating a conductive layer 17 on the protection layer 16 in the flexible thermal-control material 10E according to Example 5. That is, the conductive layer 17 is further provided on the surface of the protection layer 16, that is, the outermost surface on the space side 21.

The conductive layer 17 has a function and an effect of preventing damage to the flexible thermal-control material 10F due to an electric discharge. In addition, the conductive layer 17 is preferably a transparent conductive layer having transparency so as to allow solar light to be incident to the reflection layer 12.

As the conductive layer 17, a metal compound material having conductivity such as indium tin oxide (ITO), antimony tin oxide (ATO), or $TiO_2$ (titanium dioxide) doped with Nb, or carbon-based material such as carbon nanotube can be used.

According to the configuration described above, it is possible to provide a flexible thermal-control material having reduced risk of damage due to an electric discharge.

Example 7

Application Example (1) of Flexible Thermal-Control Material

Figure 7:
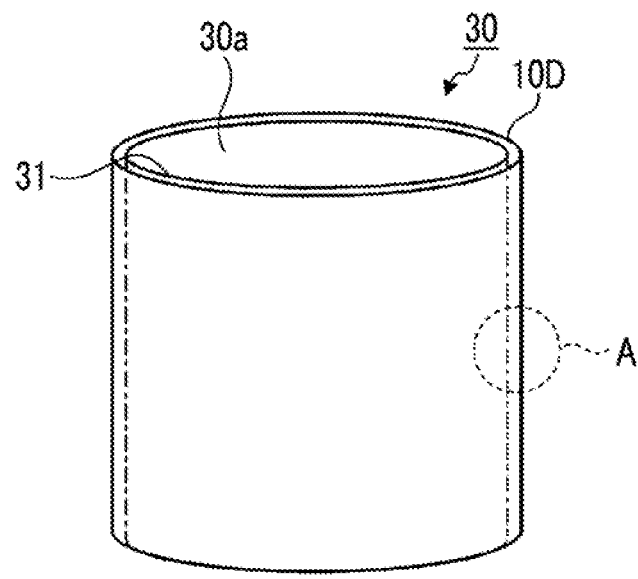
FIG. 7 is a schematic view showing an example of applying the flexible thermal-control material on an adherend.
Figure 8:
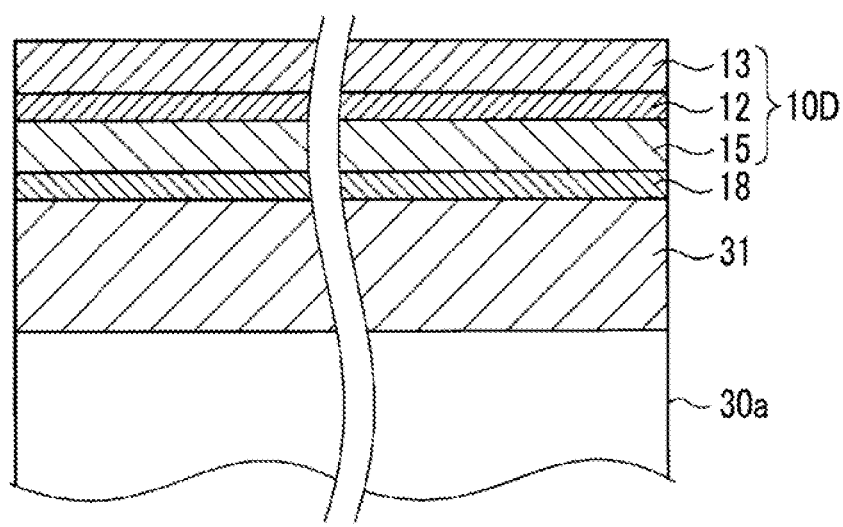
FIG. 8 is an enlarged schematic sectional view showing an enlarged A part of FIG. 7.
Figure 9:
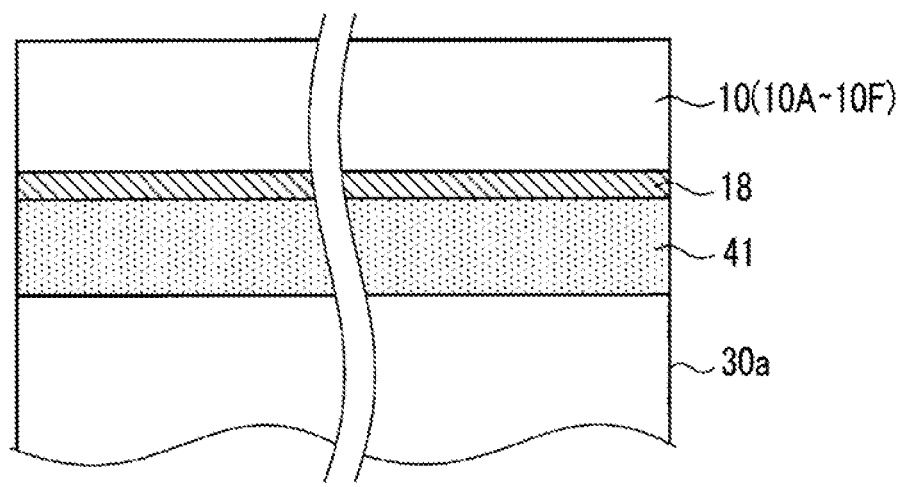
FIG. 9 is an enlarged schematic sectional view showing an enlarged A part of FIG. 7.
Figure 10:
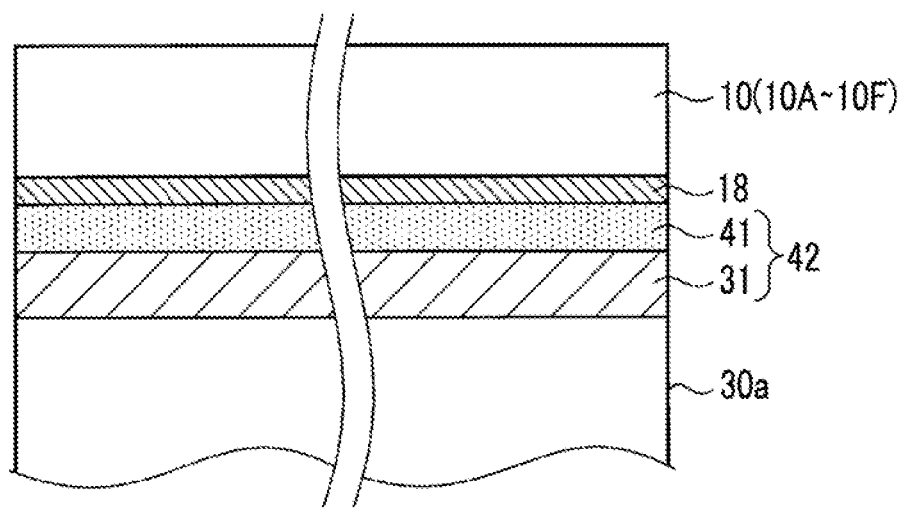
FIG. 10 is an enlarged schematic sectional view showing an enlarged A part of FIG. 7.

FIG. 7 is a schematic view showing an example of applying the flexible thermal-control material on an adherend. In the example of the drawing, an adherend is a propellant tank (for example, liquid hydrogen tank) of a rocket. FIGS. 8 to 10 are enlarged schematic sectional views showing an enlarged A part of FIG. 7.

In the example of the laminated body shown in FIG. 7, a surface of a tank main body 30a of a propellant tank 30 such as a liquid hydrogen tank is coated with the flexible thermal-control material 10D according to Example 4. Herein, a polyisocyanurate foam (PIF) heat insulating layer (hereinafter, referred to as a "PIF heat insulating layer") 31 is formed on the surface of the propellant tank and the flexible thermal-control material 10D is applied to the surface thereof.

FIG. 8 is a diagram specifically illustrating a relationship between the surface of the propellant tank of FIG. 7, that is, the PIF heat insulating layer 31, and the flexible thermal-control material 10D. As shown in FIG. 8, the flexible thermal-control material 10D in which the reflection layer 12 is laminated on the support layer 15 and the infrared radiation layer 13 is further laminated on the surface thereof, is adhered onto the PIF heat insulating layer 31 through a bonding layer 18 and covers the tank main body 30a.

The bonding layer 18 is a layer configured with an adhesive or a bonding agent, for example. As an adhesive or bonding agent, a material which hardly causes generation of gas in a vacuum environment as in space is preferable.

In the embodiment, the flexible thermal-control material 10D is adhered to the PIF heat insulating layer 31 on the surface of the liquid hydrogen tank by the bonding layer 18, but the flexible thermal-control material 10D can also be adhered to the surface of the liquid hydrogen tank by a fastening member. As the fastening member, a fastener for fastening and fixing a component to another component can be used, for example. A rivet can be used, for example, as the fastener.

FIG. 3 is a diagram in which the flexible thermal-control material 10 (10A to 10F) is provided by the bonding layer 18 using a polyimide foam heat insulating layer 41, instead of the PIF heat insulating layer 31 of FIG. 8. The polyimide foam heat insulating layer 41 is a foam in which air bubbles have an open-cell structure and exhibits an effect of vacuum insulation. A thickness of the polyimide foam heat insulating layer 41 is, for example, preferably approximately from 10 mm to 50 mm.

FIG. 10 is a diagram in which the flexible thermal-control material 10 (10A to 10F) is provided on a heat insulating layer 42 having a laminated body structure of two layers which are the PIF heat insulating layer 31 of FIG. 8 and the polyimide foam heat insulating layer 41.

The polyimide foam heat insulating layer 41 is a foam in which air bubbles have an open-cell structure and exhibits an effect of vacuum insulation. A thickness of the heat insulating layer 42 of two layers which are the PIF heat insulating layer 31 and the polyimide foam heat insulating layer 41 is, for example, preferably approximately from 10 mm to 50 mm.

In the example, the PIF heat insulating layer 31 is provided on the tank main body 30a side, but the polyimide foam heat insulating layer 41 side may be set as the tank main body 30a side and the PIF heat insulating layer 31 may be provided on the upper layer thereof.

Example 8

Application Example (2) of Flexible Thermal-Control Material

Figure 11:
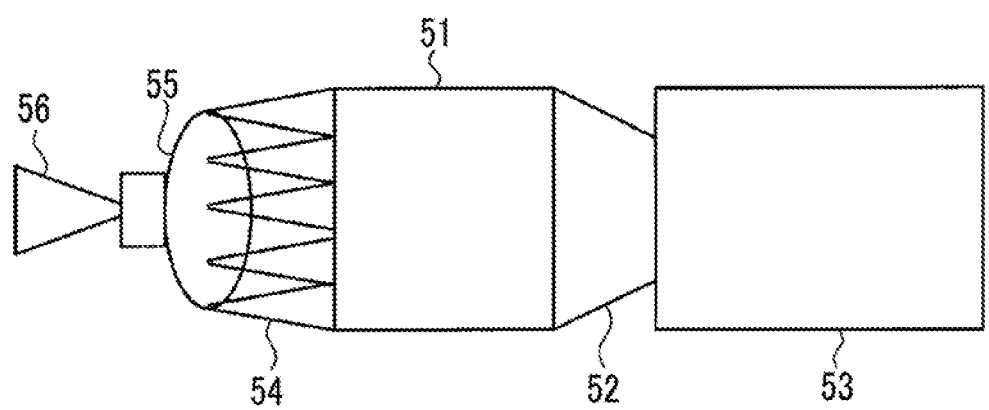
FIG. 11 is a diagram showing an example of a schematic view of a rocket.

FIG. 11 is a diagram showing an example of a schematic view of a rocket. As shown in FIG. 11, a satellite 53 is provided on a head portion side of a liquid hydrogen tank 51 which is a propellant tank through a pedestal 52. A liquid oxygen tank 55 is provided on a rear side of the liquid hydrogen tank 51 through a rod 54 and performs a supply operation to an engine 56 side.

Figure 12A:
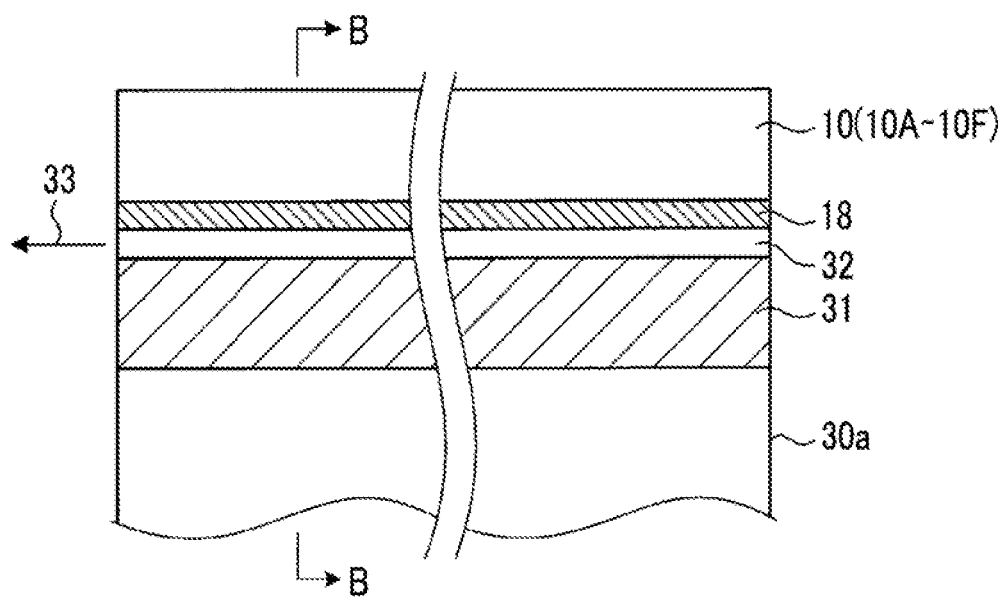
FIG. 12A is a sectional view in a longitudinal direction of a flexible thermal-control material which is applied on a liquid hydrogen tank.
Figure 12B:
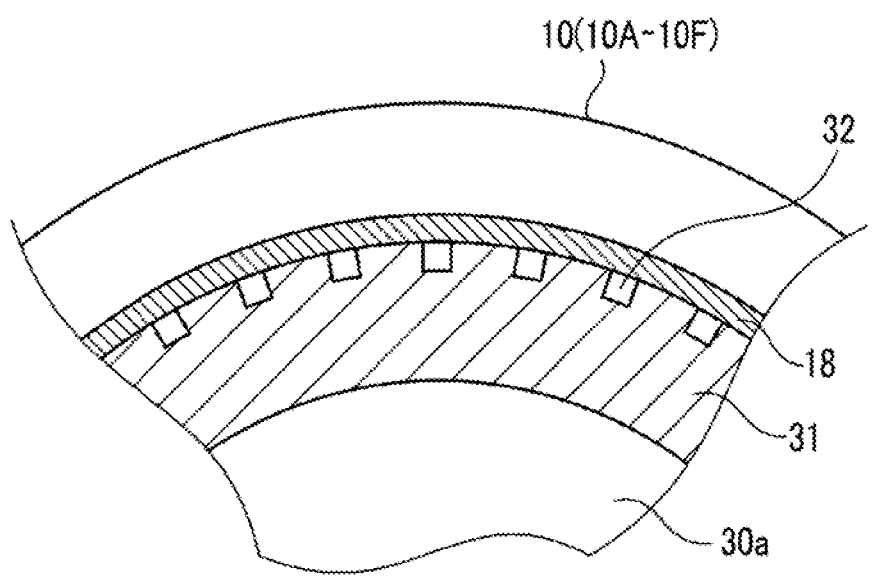
FIG. 12B is a B-B line sectional view of FIG. 12A.

FIG. 12A is a sectional view in a longitudinal direction of a flexible thermal-control material which is applied on a liquid hydrogen tank and FIG. 12B is a B-B line sectional view of FIG. 12A.

In the example, the PIF heat insulating layer 31 is formed on the surface of the liquid hydrogen tank 51 and the flexible thermal-control material 10 (10A to 10F) according to Examples described above is coated on the surface of the PIF heat insulating layer 31. The flexible thermal-control material 10 (10A to 10E) is the same material as in examples 1 to 6 and the description thereof will be omitted.

In the example, a degassing groove 32 is formed along an axial direction of the PIF heat insulating layer 31 and perform degassing of exhaust gas (for example, low molecular component) 33 generated in the PIF heat insulating layer 31.

Accordingly, negative effects such as vapor deposition due to exhaust gas 33 on the flexible thermal-control material 10 (10A to 10E) formed on the surface of the PIF heat insulating layer 31 or the satellite 53 are prevented and the satellite 53 is protected.

Figure 13:
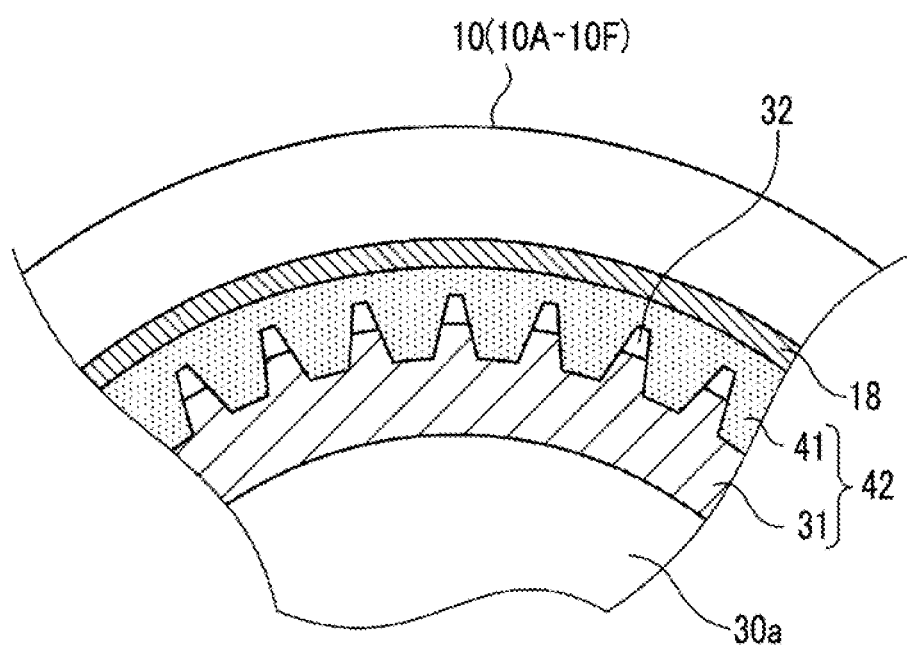
FIG. 13 is a sectional view of another flexible thermal-control material of the example which is applied on a liquid hydrogen tank.

FIG. 13 is a sectional view of another flexible thermal-control material of the example which is applied on a liquid hydrogen tank.

In the example, the heat insulating layer 42 having a two-layered structure of the PIF heat insulating layer 31 and the polyimide foam heat insulating layer 41 is provided on the surface of the tank main body 30a of the liquid hydrogen tank 51 and the flexible thermal-control material 10 (10A to 10E) according to Examples described above is coated on the surface of the heat insulating layer 42 having a two-layered structure.

In the example, the degassing groove 32 is continuously formed along an axial direction of in a boundary between the PIF heat insulating layer 31 and the polyimide foam heat insulating layer 41 and performs degassing of exhaust gas (for example, low molecular component) generated in the heat insulating layer 42. The degassing groove 32 is formed by setting a boundary surface between the PIF heat insulating layer 31 and the polyimide foam heat insulating layer 41 as an approximate gear wheel structure, but the invention is not limited thereto.

As described above, it is possible to suitably realize heat insulation in space which was insufficiently realized with only the PIF heat insulating layer, by coating the outer surface of the propellant tank of the rocket with the flexible thermal-control material according to the invention. In the related art, in a structure used in space such as a rocket or an artificial satellite, heat input from the outside is prevented by the PIF heat insulating layer and evaporation of liquid hydrogen which is propellant is prevented, but in space in a vacuum state without oxygen, heat input due to radiation is dominantly performed and sufficient heat insulating performance cannot be obtained with only the PIF heat insulating layer. It is possible to prevent problems regarding heat input due to radiation in space to improve heat insulating performance, by further coating the PIF surface with the flexible thermal-control material according to the invention.

REFERENCE SIGNS LIST 10 (10A to 10F) Flexible thermal-control material
12 Reflection layer
13 Infrared radiation layer
14 Antioxidant layer
15 Support layer
16 Protection layer
17 Conductive layer
18 Bonding layer
20 Airframe side (adherend side)
21 Space side
30 Propellant tank (adherend)
31 PIF heat insulating layer
41 Polyimide foam heat insulating layer

The invention claimed is:

1. A laminated flexible thermal-control material comprising:
    a reflection layer which reflects solar light;
    an infrared radiation layer which is laminated on the reflection layer and radiates infrared light,
        wherein the infrared radiation layer is a silsesquioxane layer having a thickness of equal to or smaller than 10 µm and having solar absorptance coefficient $\alpha$ equal to or less than 0.1;
    a support layer which is laminated on a surface of the reflection layer on the side opposite to the surface where the infrared radiation layer is laminated,
        wherein the support layer comprises polyimide or polyester;
    a protection layer laminated on a surface of the infrared radiation layer on the side opposite to the surface where the reflection layer is laminated; and
    a conductive layer laminated on the protection layer.

2. The laminated flexible thermal-control material according to claim 1, further comprising an antioxidant layer laminated between the reflection layer and the support layer.

3. A rocket or an artificial satellite used in space comprising the laminated flexible thermal-control material according to claim 1, which is wrapped around a propellant tank and fixed to a surface of the propellant tank by a bonding layer or a fastening member.

4. The rocket or artificial satellite according to claim 3, wherein the propellant tank is a liquid hydrogen tank.

5. The rocket or artificial satellite according to claim 3, wherein the bonding layer or fastening member is at least one layer selected from the group consisting of a polyisocyanurate foam (PIF) heat insulating layer, a polyimide foam heat insulating layer, and a heat insulating layer of a laminated body of the PIF heat insulating layer and the polyimide foam heat insulating layer.

6. The rocket or artificial satellite according to claim 5, wherein the at least one layer comprises a degassing groove.

* * * * *